US010428733B2

(12) United States Patent
Poisson et al.

(10) Patent No.: US 10,428,733 B2
(45) Date of Patent: Oct. 1, 2019

(54) TURBOPROP AIR INTAKE

(71) Applicants: SNECMA, Paris (FR); SOCIETE LORRAINE DE CONSTRUCTION AERONAUTIQUE, Florange (FR)

(72) Inventors: Mathieu Ange Poisson, Moissy-Cramayel (FR); Stéphane Orcel, Moissy-Cramayel (FR); Guillaume Glemarec, Morangis (FR); Jean-Luc Pacary, Saint Cyr L'ecole (FR)

(73) Assignees: SNECMA, Paris (FR); SOCIETE LORRAINE DE CONSTRUCTION AERONAUTIQUE, Florange (FR)

( * ) Notice: Subject to any disclaimer, the term of this patent is extended or adjusted under 35 U.S.C. 154(b) by 538 days.

(21) Appl. No.: 15/029,588

(22) PCT Filed: Oct. 14, 2014

(86) PCT No.: PCT/FR2014/052620
§ 371 (c)(1),
(2) Date: Apr. 14, 2016

(87) PCT Pub. No.: WO2015/055948
PCT Pub. Date: Apr. 23, 2015

(65) Prior Publication Data
US 2016/0237898 A1 Aug. 18, 2016

(30) Foreign Application Priority Data

Oct. 17, 2013 (FR) ...................................... 13 60130

(51) Int. Cl.
*B64D 33/02* (2006.01)
*F01D 25/24* (2006.01)
(Continued)

(52) U.S. Cl.
CPC .............. *F02C 7/045* (2013.01); *B64D 33/02* (2013.01); *F01D 25/243* (2013.01); *F02C 7/04* (2013.01);
(Continued)

(58) Field of Classification Search
CPC ............ B64D 33/02; B64D 2033/0293; F01D 25/243; F02C 7/04; F02C 7/045; F02K 3/06
See application file for complete search history.

(56) References Cited

U.S. PATENT DOCUMENTS 4,346,860 A * 8/1982 Tedstone ................... F02C 7/05
244/53 B
5,725,180 A 3/1998 Chamay et al.
(Continued)

FOREIGN PATENT DOCUMENTS

EP 1 657 156 A1 5/2006
GB 1 201 096 A 8/1970

OTHER PUBLICATIONS

Written Opinion of the International Searching Authority dated Feb. 12, 2015, issued in corresponding International Application No. PCT/FR2014/052620, filed Oct. 14, 2014, 6 pages.
(Continued)

*Primary Examiner* — Woody A Lee, Jr.
*Assistant Examiner* — Christopher R Legendre
(74) *Attorney, Agent, or Firm* — Christensen O'Connor Johnson Kindness PLLC

(57) ABSTRACT

A turboprop includes a rotary propeller upstream from an engine and an air intake that is not coaxial to the propeller, said air intake defining a conduit for supplying air to the engine and further defining a bypass to said conduit, the bypass having an outlet oriented substantially axially towards the downstream of the engine. The turboprop fur-
(Continued)

ther includes a nacelle surrounding the engine and the air intake, wherein the air intake is secured to a housing of the engine and is not rigidly connected to the nacelle, so as to allow, during operation, relative movements between the air intake and the nacelle. The outlet is connected by a flexible link to an intake of an air circuit carried by the nacelle.

10 Claims, 3 Drawing Sheets

(51) Int. Cl.
*F02C 7/04* (2006.01)
*F02C 7/045* (2006.01)
*F02K 3/06* (2006.01)

(52) U.S. Cl.
CPC ........ *F02K 3/06* (2013.01); *B64D 2033/0293* (2013.01); *F05D 2220/324* (2013.01); *F05D 2220/36* (2013.01); *F05D 2250/51* (2013.01); *F05D 2260/606* (2013.01); *F05D 2260/96* (2013.01); *Y02T 50/672* (2013.01)

(56) References Cited

U.S. PATENT DOCUMENTS

| | | |
|---|---|---|
| 2003/0113205 A1 | 6/2003 | Negulescu et al. |
| 2005/0229605 A1 | 10/2005 | Bouchard et al. |
| 2006/0101802 A1* | 5/2006 | Hans .................... B64D 33/02 60/39.093 |
| 2016/0237898 A1* | 8/2016 | Poisson .................... F02C 7/04 |

OTHER PUBLICATIONS

International Preliminary Report on Patentability dated Apr. 19, 2016, issued in corresponding International Application No. PCT/FR2014/052620, filed Oct. 14, 2014, 1 page.

International Search Report dated Feb. 12, 2015, issued in corresponding International Application No. PCT/FR2014/052620, filed Oct. 14, 2014, 7 pages.

Witten Opinion dated Feb. 12, 2015, issued in corresponding International Application No. PCT/FR2014/052620, filed Oct. 14, 2014, 5 pages.

* cited by examiner

TURBOPROP AIR INTAKE

TECHNICAL FIELD

The present invention relates to a turboprop engine of the type comprising a rotary propeller upstream of an engine and an air intake that is not coaxial to the propeller.

PRIOR ART

The air intake for this type of turboprop engine is generally located below the propeller or, more specifically, in the 6 o'clock position using the 12-hour clock analogy. The propeller and the air intake are therefore not coaxial.

This air intake defines a conduit for supplying air to the engine and comprises a lip at its upstream end. The conduit that is defined by the air intake is in fluid communication with a duct that is defined by an engine housing. The outlet of the conduit is therefore aligned with the intake of this duct. The lip of the air intake is faired so that its periphery is aligned with cowls of the nacelle of the turboprop engine, this nacelle surrounding the air intake and the engine of the turboprop engine.

The propeller is generally borne by a gearbox, referred to as a PGB (Power Gear Box), which, together with the engine, is suspended from a metallic support, referred to as a cradle, of the turboprop engine by means of flexibly deformable means forming a flexible link. The cowls of the nacelle are borne by the cradle. During operation, relative movements between the engine and the nacelle occur as a result of the aforementioned flexible link.

In current technology, the air intake is rigidly connected to part of the nacelle and is not rigidly connected to the engine. A seal is mounted between the outlet of the air intake conduit and the intake of the engine housing duct so as to prevent air leaks in this region.

The relative movements between the engine and the nacelle therefore lead to relative movements between the air intake and the engine, which can disrupt the air supply flow of the engine compressor(s) and therefore lower the performance of the turboprop engine. This drop in performance can be broken down into a decrease in the aerodynamic output of the air intake and into a decrease in the output of the engine compressor(s). In some cases, the misalignment between the air intake and the engine housing can be such that engine operability also can be called into question. Furthermore, the weight of the air intake must be borne by the nacelle, which therefore must be designed to fulfil this function.

The present invention particularly provides a simple, efficient and economical solution to these problems.

DISCLOSURE OF THE INVENTION

The invention proposes a turboprop engine comprising a rotary propeller upstream of an engine and an air intake that is not coaxial to the propeller, this air intake defining a conduit for supplying air to the engine and further defining a bypass to said conduit, said bypass comprising an outlet that is oriented substantially axially downstreamward of the engine, the turboprop engine further comprising a nacelle surrounding the engine and the air intake, characterised in that the air intake is fixed to an engine housing and is not rigidly connected to the nacelle so as to allow relative movements between the air intake and the nacelle during operation, said outlet being connected by means of a flexible link to an intake of an air system borne by the nacelle.

As opposed to the prior art, in which the air intake is rigidly connected to the nacelle and is not rigidly connected to the engine, the air intake according to the invention is rigidly connected to the engine and is not rigidly connected to the nacelle. The relative movements between the engine and the nacelle therefore do not lead to relative movements between the air intake and the engine and therefore no longer affect the air supply to the engine. The flow between the air intake and the engine is aerodynamically more stable, which allows the performance of the engine compressor(s) and engine operability to be improved.

Furthermore, the weight of the air intake is now borne by the engine. It is therefore conceivable to lighten the nacelle, which consequently no longer has to bear this weight.

In the engines of the prior art, the maintenance assembly/disassembly operations ultimately create significant clearance in the region of the seal, which in extreme cases can result in engine surging phenomena.

A further advantage of the invention is that of allowing the structure of the air intake to be managed in the region of the engine (the nacelle being produced by a nacelle manufacturer). The air intake/nacelle interface has therefore been moved to a location that is less detrimental to the performance of the engine in the event of misalignment. In this way, the engine manufacturer can better control the performance of his engine.

In the present application, two rigidly connected elements are understood to be two elements that are fixed to each other, for example by means of a mechanical link, or that can be formed from a single part. On the contrary, two elements that are not rigidly connected together are independent of each other such that a movement in one of the elements does not lead to a movement in the other element. Two elements that are not rigidly connected together nevertheless can be connected together by means of a flexible link, which is formed by a seal, for example.

Advantageously, the air intake is fixed to the housing via a downstream end, the conduit that is defined by said air intake opening via this downstream end into a duct that is defined by said housing.

Preferably, the air intake comprises a bolt-fixing flange or a clamping ring for fixing to the engine housing.

The air intake comprises a lip at its upstream end. A seal can be mounted between this lip and the nacelle. This allows a flexible link to be established between the air intake lip and the nacelle and a seal to be provided for this link, allowing relative movements between the air intake and the nacelle.

A de-icing system (hot air, pneumatic, electrical, etc.) can be mounted in the air intake lip and can be borne by this lip. The weight of the de-icing system is therefore borne by the engine of the turboprop engine.

The outlet of the bypass can supply an air-oil exchanger (of the ACOC type, for example) that is borne by the nacelle. A seal can be mounted between the bypass outlet and the exchanger.

The turboprop engine preferably comprises means for suspending the air intake from a housing of a gearbox and, in particular, from the PGB gearbox of the turboprop engine. As previously explained, the PGB gearbox is suspended from the cradle of the turboprop engine by flexibly deformable means forming a flexible link. The air intake according to the invention is therefore connected to the engine via two attachment planes, namely an upstream and a downstream plane. Indeed, one problem to be overcome when changing the structure according to the prior art thus involves finding a second attachment plane for this air intake. The implemented solution enables this in a simple and efficient manner.

The means for suspending the air intake can comprise connecting rods that are hinged at their two ends, at least part of these connecting rods possibly being associated with vibration damping means. These suspension means makes it possible to limit the stresses borne by the engine housing during operation by leaving degrees of freedom at the air intake.

The air intake can be suspended from the housing of the gearbox by means of a torque-absorbing or torsion bar, particularly of the torque tube type. This bar extends substantially perpendicular to the longitudinal axis of the turboprop engine and comprises, at its longitudinal ends, means for fixing to the housing of the gearbox and to the cradle. The bar allows the propeller engine torque to be transferred to the cradle without passing through the flexible link between the engine and the cradle in order to protect this link. The torsional rigidity of the bar is determined so as to absorb the engine torque. This type of bar is well known to a person skilled in the art (see EP-B1-0 761 945, for example).

Advantageously, the air system that is borne by the nacelle comprises a heat exchanger that is cooled by the air from the bypass.

The present invention further relates to an air intake for a turboprop engine as described above, defining both a conduit for supplying air to the engine, and a bypass, characterised in that said air intake comprises, at a downstream end thereof, a flange for fixing to an engine housing of the turboprop engine.

At its upstream end, the air intake can comprise a lip having a seal that is intended to cooperate with the nacelle of the turboprop engine. The intake can define a bypass for said conduit, with the outlet of this bypass having a seal that forms a flexible link that is intended to engage with an air-oil exchanger borne by the nacelle of the turboprop engine.

The air intake can comprise means, for example clevises, for attaching to means for suspending from a housing of a gearbox.

The air intake according to the invention can be made of a composite material. In this case, the fixing flange and/or the clevises can be metallic and fixed to the air intake by means such as rivets, or can be inserted part way into the composite material.

DESCRIPTION OF THE DRAWINGS

The invention will be better understood, and further details, features and advantages of the invention will become apparent, upon reading the following description, which is provided by way of a non-limiting example and with reference to the accompanying drawings, in which.

DETAILED DESCRIPTION

Figure 1:
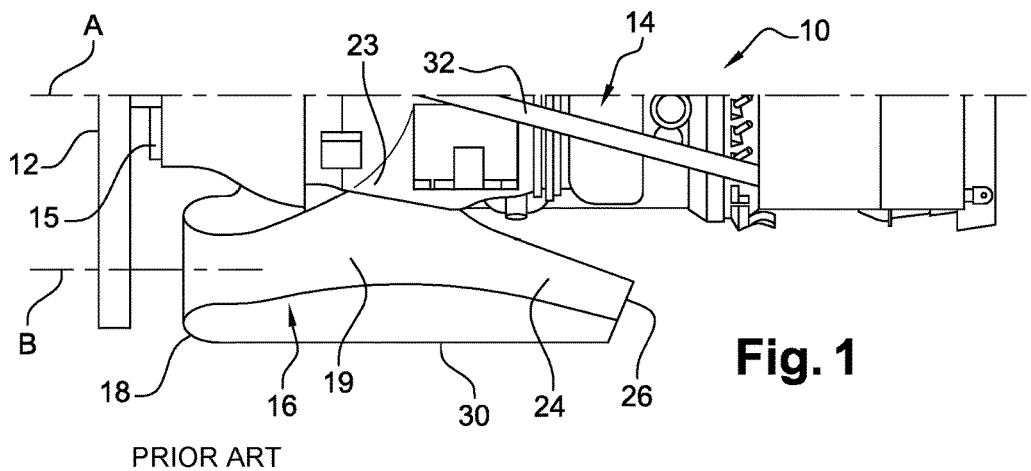
FIG. 1 is a partial schematic view of an aircraft turboprop engine according to the prior art.
Figure 2:
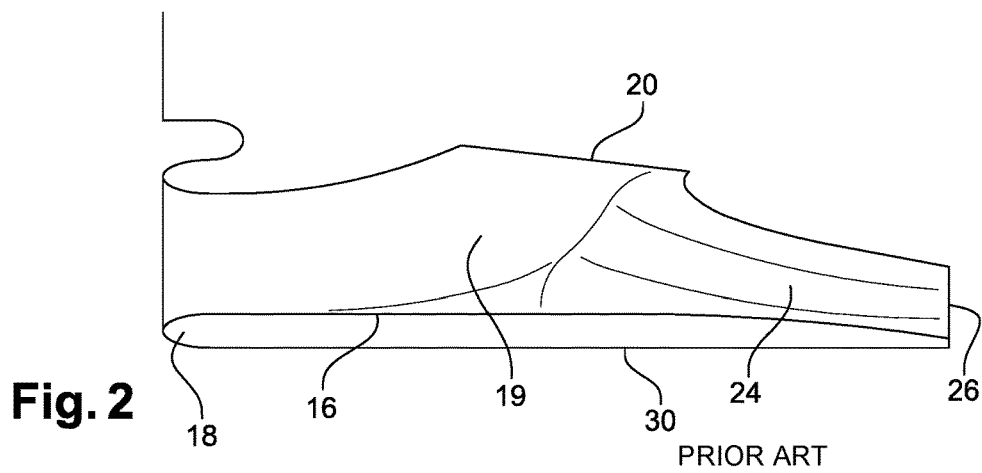
FIG. 2 is a perspective schematic view of the air intake of the turboprop engine of FIG. 1.

Firstly, reference will be made to FIGS. 1 to 3, which show an aircraft turboprop engine 10 according to the prior art of the present invention.

The turboprop engine 10 comprises a propeller 12 that is rotationally mounted upstream of an engine 14 that conventionally comprises, in the upstream to downstream direction (from left to right in the drawing) according to the direction of flow of the gases in the turboprop engine, compression stages, a combustion chamber, turbine stages and a combustion gas exhaust pipe. The propeller 12 is rotated by a gearbox 15, referred to as a PGB.

The engine 14 is supplied with air via an air intake 16, which in this case is located below the propeller 12 or, more specifically, in the 6 o'clock position using the 12-hour clock analogy.

The air intake 16 comprises a lip 18 at its upstream end and defines a main conduit 19 for supplying air to the engine, the downstream outlet 20 of this conduit 19 opening into an upstream intake 22 of a duct that is defined by a housing 23 of the engine 14.

The lip 18 of the air intake defines an opening that axially opens downstreamward and for which the axis B is parallel and spaced apart from the axis of rotation A of the propeller. The conduit 19 that is defined by the air intake 16 has a slightly bent shape, the outlet thereof being radially oriented inward and downstreamward (relative to the axis A). The drawings clearly show that the propeller 12 and the air intake 16 are not coaxial.

Figure 3:
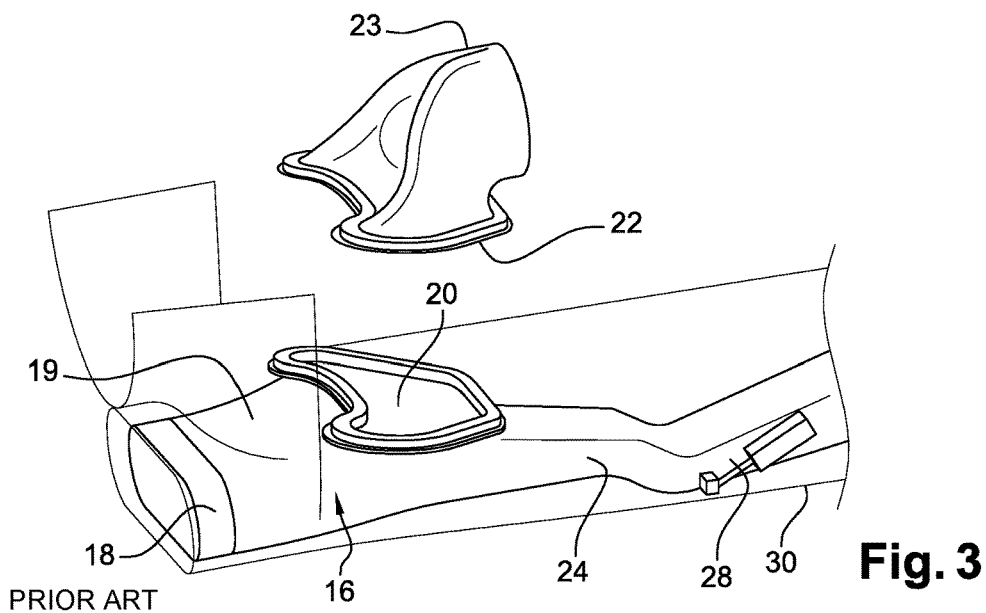
FIG. 3 is a partial perspective schematic view of the turboprop engine of FIG. 1.

The air intake 16 further defines a bypass 24 to the main conduit 19, this bypass comprising an outlet 26 that is oriented substantially axially downstreamward and opens into an intake of an air system of an air-oil exchanger 28 of the ACOC type, for example (FIG. 3).

The turboprop engine 10 further comprises a nacelle 30 (shown in part) that surrounds the engine 14 and the air intake 16. The nacelle 30 is borne by a cradle 32, which is used to fix the turboprop engine to the aircraft, and the gearbox 15 and the engine are connected to this cradle 32 by means of flexibly deformable means, such as flexible studs, that allow relative movements between the engine and the nacelle during operation.

In the prior art that is shown in the drawings, the air intake 16 is rigidly connected to the nacelle 30. The relative movements between the engine 14 and the nacelle 30 therefore lead to relative movements between the engine housing 23 and the air intake 16, which disrupts the airflow from the air intake towards the engine and reduces the performance of the turboprop engine.

According to the invention, the air intake is no longer rigidly connected to the nacelle but instead is rigidly connected to the engine housing. FIGS. 4 to 7 show a first embodiment of the invention, in which the elements that have already been previously described are identified using the same reference numerals plus one hundred.

As in the aforementioned case, the turboprop engine 110 that is shown in FIGS. 4 to 7 comprises an upstream rotary propeller 112, an engine 114 that is supplied with air via an air intake 116 that is not coaxial to the propeller and a nacelle 130 that surrounds the engine and the air intake.

The main conduit 119 that is defined by the air intake 116 in this case comprises, at the downstream end thereof, i.e. at its outlet 120, a peripheral flange 121 for fixing to a corresponding flange of the intake of the engine housing 123.

Figure 7:
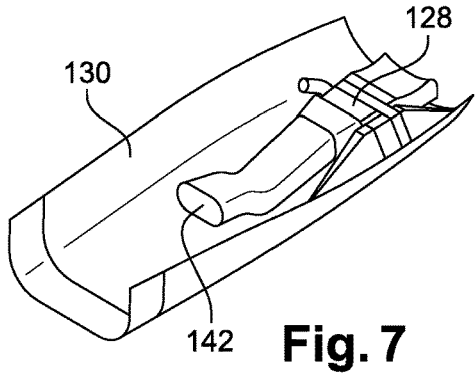
FIG. 7 is a perspective schematic view of a nacelle cowl of the turboprop engine of FIG. 4.

The bypass 124 of the air intake 116 comprises, at the downstream end thereof, i.e. at its outlet 126, a seal 140 that is intended to engage with the intake 142 of the air system of the air-oil exchanger 128, which in this case is borne by a cowl of the nacelle 130 (FIG. 7).

Figure 4:
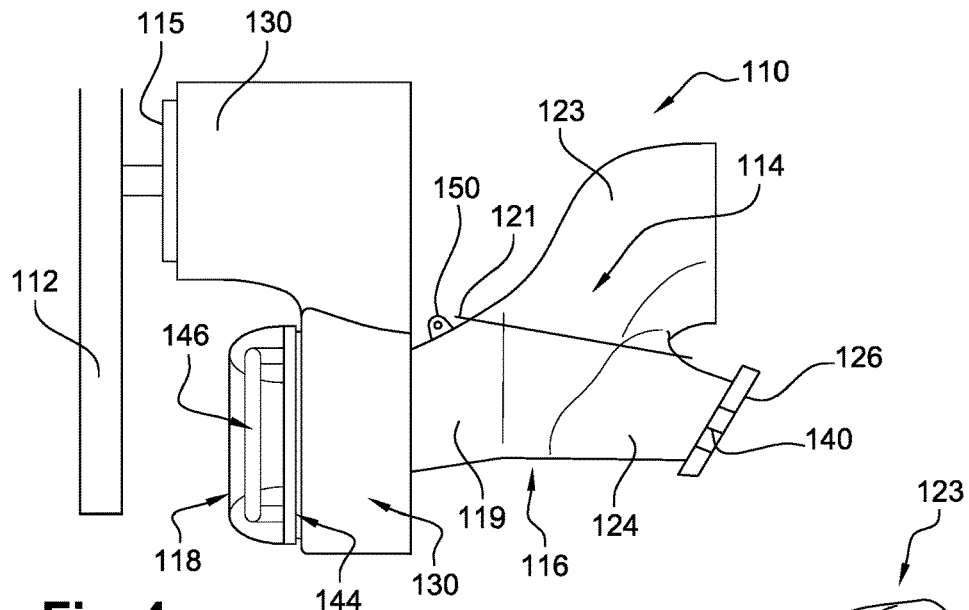
FIG. 4 is a partial schematic view of a turboprop engine according to the invention.
Figure 5:
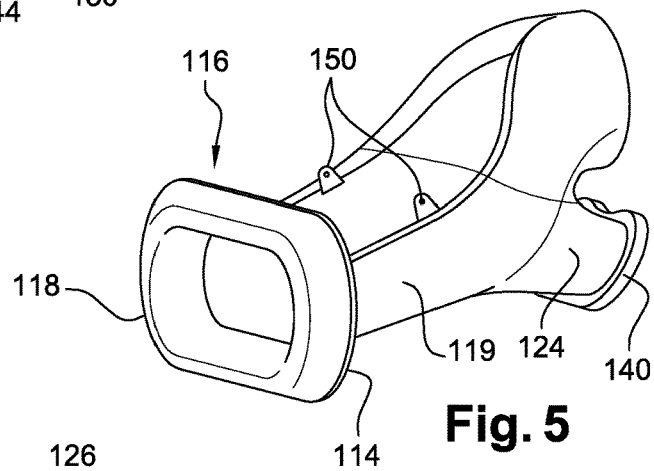
FIG. 5 is a perspective schematic view of the air intake and of the engine housing of the turboprop engine of FIG. 4.
Figure 6:
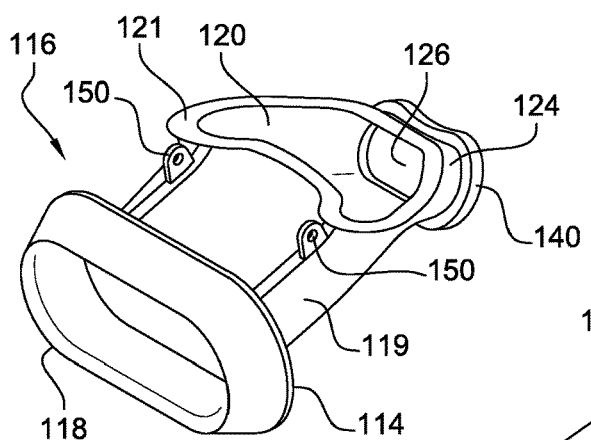
FIG. 6 is a perspective schematic view of the air intake of the turboprop engine of FIG. 4.

The lip 118 of the air intake 116 comprises, at the downstream end thereof, a seal 144 that is intended to engage with a corresponding part of the nacelle 130. As can be seen in FIG. 4, a de-icing system 146, which is per se known to a person skilled in the art, is mounted inside the lip 118 of the air intake 116 and in this case is borne by this lip.

During operation, relative movements can occur between the air intake 116 and the nacelle 130 due to the fact that the air intake is rigidly connected to the engine 114. The seals 140 and 144 form flexible links and provide a seal both between the air intake 116 and the exchanger 128 and between the lip 118 of the air intake and the nacelle 130. The seals 140, 144 can be of the bellows type.

In order to prevent the air intake 116 from being fixed in an overhanging manner to the engine housing 123 that will then support the weight of the air intake and the de-icing system 146, it is advantageous for a further attachment or link to be provided between the air intake and the engine.

In the embodiments of FIGS. 8 to 11, the air intake 116 is suspended from the gearbox 115 (PGB) of the turboprop engine by means of hinged connecting rods 148, preferably by ball joints.

Figure 8A:
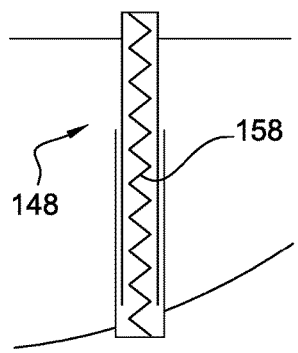
FIG. 8a is an exploded and more detailed view of section I of FIG. 8.
Figure 8:
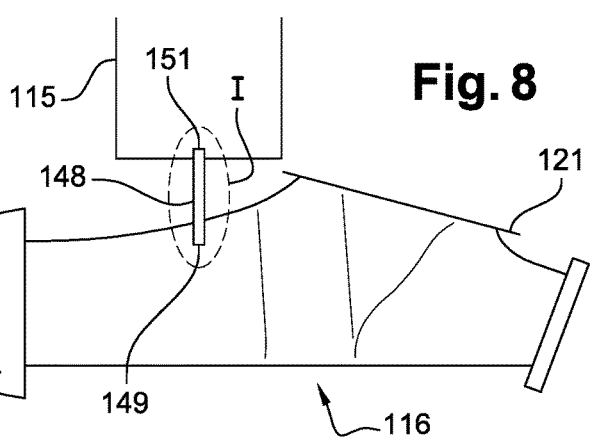
FIGS. 8 and 9 are highly schematic views of the means for suspending the air intake according to the invention from a gearbox of the turboprop engine.
Figure 9:
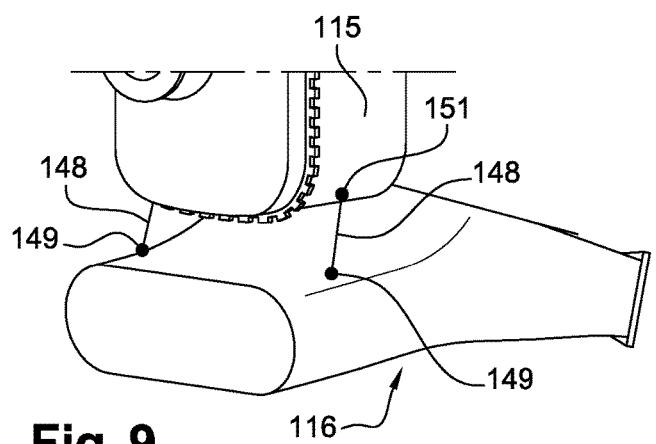

In the first embodiment shown in FIGS. 8 and 9, the air intake 116 is directly suspended from the gearbox 115 by means of two connecting rods 148 that extend substantially in a plane perpendicular to the longitudinal axis of the turboprop engine. The connecting rods 148 are symmetrically disposed relative to a plane passing through the axis of the turboprop engine.

Each connecting rod 148 comprises a first end 149 which is ball jointed to a clevis 150 that is rigidly connected to the air intake (FIGS. 4-6) and a second opposite end 151 which is ball jointed to a clevis that is rigidly connected to the housing of the gearbox 115.

Figure 11:
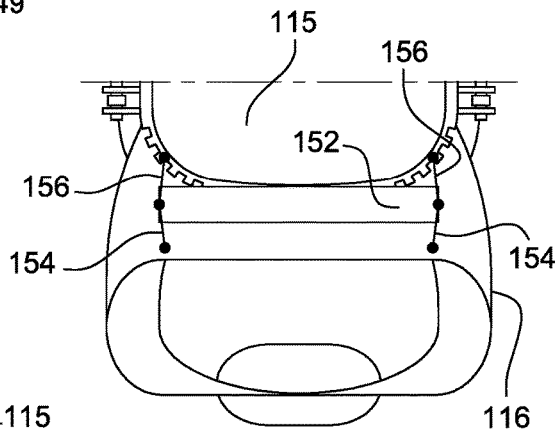
FIGS. 10 and 11 are highly schematic views of a variant of an alternative embodiment of the means for suspending the air intake.
Figure 10:
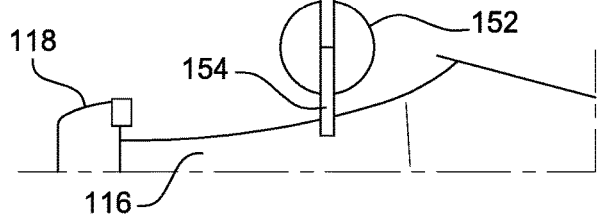

In the variation that is shown in FIGS. 10 and 11, the air intake 116 is suspended from the gearbox 115 by means of a torsion bar 152 that extends in a plane that is substantially perpendicular to the longitudinal axis of the turboprop engine. The air intake is connected and suspended by means of two connecting rods 154 at the longitudinal ends of the bar 152 and is itself connected and suspended from the gearbox by means of two other connecting rods 156 and even by fixing plates. Each pair of connecting rods 154, 156 is symmetrically disposed relative to a plane passing through the axis of the turboprop engine. Each connecting rod 154, 156 can be hinged by means of a ball joint at each of its ends.

At least some of the connecting rods 148, 154, 156 can be equipped with means 158 for damping vibrations that are transmitted by the gearbox 115 during operation (FIG. 8*a*).

According to further alternative embodiments (not shown) of the suspension means, said means can comprise a single connecting rod or more than two connecting rods, bolted fixing supports, a clamping ring, flexible studs, etc.

The invention claimed is:

1. A turboprop engine comprising a rotary propeller upstream of an engine having an engine housing with an air intake that is not coaxial to the propeller, said air intake defining a main conduit for supplying air to the engine and further defining a bypass to said main conduit, said bypass comprising an outlet that is oriented axially in a downstream direction of the engine, the turboprop engine further comprising a nacelle surrounding the engine and the air intake, wherein the air intake comprises, at an end of the main conduit, a peripheral flange for fixing to a corresponding flange of the air intake and wherein the air intake is not rigidly connected to the nacelle so as to allow relative movements between the air intake and the nacelle during operation, said outlet being connected by means of a flexible link to an intake of an air system borne by the nacelle, wherein the turboprop engine comprises means for suspending the air intake from a housing of a gearbox.

2. The turboprop engine according to claim 1, wherein the air intake is fixed to said engine housing via a downstream end of the air intake, the main conduit that is defined by the air intake opening via the downstream end of the air intake into a duct that is defined by said engine housing.

3. The turboprop engine according to claim 1, wherein the flange of the air intake is configured for bolt-fixing to the engine housing.

4. The turboprop engine according to claim 1, wherein the air intake comprises a lip at an upstream end of the air intake, a seal being mounted between the lip and the nacelle.

5. The turboprop engine according to claim 1, wherein the means for suspending comprise connecting rods that are hinged at two ends thereof.

6. The turboprop engine according to claim 1, wherein the means for suspending is a torque-absorbing bar.

7. The turboprop engine according to claim 1, wherein the air system that is borne by the nacelle comprises a heat exchanger that is cooled by the air from the bypass.

8. A turboprop engine comprising a rotary propeller upstream of an engine having an engine housing with an air intake that is not coaxial to the propeller, said air intake defining a main conduit for supplying air to the engine and further defining a bypass to said main conduit, said bypass comprising an outlet that is oriented axially in a downstream direction of the engine, the turboprop engine further comprising a nacelle surrounding the engine and the air intake,
    the air intake comprising, at an end of the main conduit,
        a peripheral flange for fixing to a corresponding flange of the air intake of an engine housing and being not rigidly connected to the nacelle so as to allow relative movements between the air intake and the nacelle during operation, said outlet being connected by means of a flexible link to an intake of an air system borne by the nacelle, wherein said air intake comprises, at a downstream end thereof, said flange for fixing to the engine housing of the turboprop engine and comprises means for attaching to means for suspending from a housing of a gearbox of the turboprop engine.

9. The air intake according to claim 8, wherein said turboprop engine comprises, at an upstream end of the air intake, a lip having a seal that forms a flexible link that engages with the nacelle of the turboprop engine.

10. The turboprop engine according to claim 8, wherein the means for attaching comprises at least one clevis.

* * * * *